(12) United States Patent
Kuniba et al.

(10) Patent No.: US 6,943,833 B1
(45) Date of Patent: Sep. 13, 2005

(54) ELECTRONIC CAMERA

(75) Inventors: Hideyasu Kuniba, Shinagawa-ku (JP); Sadami Okada, Sakado (JP); Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 779 days.

(21) Appl. No.: 10/018,466

(22) PCT Filed: Sep. 19, 2000

(86) PCT No.: PCT/JP00/06378

§ 371 (c)(1),
(2), (4) Date: Dec. 19, 2001

(87) PCT Pub. No.: WO01/22722

PCT Pub. Date: Mar. 29, 2001

(30) Foreign Application Priority Data

Sep. 22, 1999 (JP) .................................. 11-268825

(51) Int. Cl.[7] .............................................. H04N 5/76
(52) U.S. Cl. .................................... 348/231.1; 386/109
(58) Field of Search ........................ 348/231.1, 231.2, 348/231.99, 231.6, 231.9; 386/109, 112, 386/117; 358/909.1, 1.16; 382/239

(56) References Cited

U.S. PATENT DOCUMENTS

| | | | |
|---|---|---|---|
| 5,594,598 A | | 1/1997 | Shikakura |
| 6,118,920 A | * | 9/2000 | Sato ............................. 386/46 |
| 6,788,341 B2 | * | 9/2004 | Tsunoda et al. .......... 348/231.1 |
| 6,816,071 B2 | * | 11/2004 | Conti .......................... 340/540 |
| 6,834,130 B1 | * | 12/2004 | Niikawa et al. ............ 382/305 |
| 6,862,106 B1 | * | 3/2005 | Matsushima ............... 358/1.17 |
| 6,864,917 B2 | * | 3/2005 | Malloy Desormeaux . 348/231.1 |
| 2001/0000969 A1 | * | 5/2001 | Ohta et al. .................. 348/231 |

FOREIGN PATENT DOCUMENTS

| | | |
|---|---|---|
| JP | A 62-154152 | 7/1987 |
| JP | A 2-231881 | 9/1990 |
| JP | A 5-64143 | 3/1993 |
| JP | A 5-75966 | 3/1993 |
| JP | A 8-37633 | 2/1996 |
| JP | B2 2526033 | 5/1996 |

* cited by examiner

*Primary Examiner*—Wendy R. Garber
*Assistant Examiner*—Jacqueline Wilson
(74) *Attorney, Agent, or Firm*—Oliff & Berridge PLC (57) ABSTRACT

A portion of the capacity of a storage medium is set aside in advance as an adjustment capacity to be utilized in making an adjustment on the extent by which the target code volume is exceeded during a fixed-length compression. A nominal remaining frame quantity calculated by excluding the adjustment capacity from the remaining capacity is indicated as the remaining frame quantity at the storage medium to prevent any irregular change in the number of remaining frames displayed at the electronic camera. In addition, by allowing the compression code volume to exceed the target in correspondence to the excess (the estimated capacity value representing the remaining area) of the remaining capacity, a planned reduction in the remaining area is achieved.

7 Claims, 6 Drawing Sheets

ELECTRONIC CAMERA

The disclosure of the following priority application is herein incorporated by reference: Japanese Patent Application No. H11-268825 filed Sep. 22, 1999.

TECHNICAL FIELD

The present invention relates to an electronic camera that implements image compression so as to achieve a substantially constant code volume resulting from image data compression.

BACKGROUND ART

A large volume of image data handled in an electronic camera or a computer normally undergo image compression (e.g., JPEG compression) processing. The image compression processing may be executed through, for instance, the following steps 1–6.

1. The electronic camera determines a target image data compression rate (target code volume) in correspondence to the compressed image quality setting selected by the photographer (e.g., by switching to one of; FINE/NORMAL/BASIC).

2. The electronic camera divides the image data constituted of the brightness Y and the color differences Cb, Cr into blocks each made up of, for instance, 8×8 pixels. The electronic camera then implements DCT (discrete cosine transform) in units of the individual blocks resulting from the division and obtains transformation coefficients each corresponding to one of 8×8 discrete spatial frequencies.

3. The electronic camera prepares a reference quantization table defining a quantization step in correspondence to each of the 8×8 transformation coefficients. By multiplying data in the reference quantization table by a scale factor SF (a type of compression parameter), the electronic camera obtains a quantization table to be utilized in actual processing.

4. The electronic camera quantizes each of the 8×8 transformation coefficients using the quantization table obtained in step 3.

5. The electronic camera encodes the DC component in the quantized data in order to eliminate any redundancy while allowing for an estimated difference relative to the immediately preceding block. In addition, it implements zigzag scanning on the AC component in the quantized data and then encodes the AC component in order to eliminate any redundancy.

6. If the size of the compressed file (hereafter referred to as the "compression size") deviates from the allowable target code volume range, the electronic camera first readjusts the value of the scale factor SF and then re-engages in the operation in step 3 above. If, on the other hand, the compression size is within the allowable target code volume range (normally set to; target code volume±allowable error), it ends the image compression processing.

Through the processing described above, the image data can be compressed at a compression rate within the allowable target compression rate range.

If the allowable target code volume range is set to a fixed range such as target code volume±allowable error as explained above, the compression code volume fluctuates within the allowable range. As a result, when the compressed data having undergone the image compression processing are sequentially recorded at a storage medium, there will be a significant unused area remaining on the storage medium, i.e., an area the size of which is not large enough to record the compression code volume corresponding to a single frame (hereafter referred to as a "remaining area"). While the size of the remaining area changes as of the photographing/recording operation advances due to the inconsistency in the compression code volume mentioned earlier, the average compression code volume is highly likely to be roughly equal to the target code volume. Accordingly the remaining area does not manifest the tendency for either a steady increase or a steady decrease as the photographing/recording operation progresses.

In addition, the capacity of the storage medium is not always set at an integral multiple of the target code volume.

For the reasons stated above, a remaining area the size of which cannot be disregarded is often left on the storage medium. From the viewpoint of preventing any image quality loss during the image compression, it is desirable to maximize the compression code volume per frame so as to leave as little remaining area as possible.

DISCLOSURE OF THE INVENTION

An object of the present invention is to provide an electronic camera that allows the target code volume to be exceeded as necessary when the electronic camera engages in a fixed-length compression in order to minimize the size of the remaining area.

In order to achieve the object described above, an electronic camera according to the present invention comprises an image-capturing element that captures an image of a subject and outputs image data of the captured subject image, a compression processing unit that implements a fixed-length compression on the image data so as to compress the image data within a specific range of a target code volume, a recording unit that records compressed data resulting from the compression implemented at the compression processing unit into a storage medium, a remaining-capacity detection unit that detects the remaining capacity of the storage medium, a remaining-capacity correction unit that determines a nominal remaining capacity by subtracting a predetermined adjustment capacity from the remaining capacity, a remaining frame quantity calculation unit that determines a nominal remaining frame quantity by dividing the nominal remaining capacity by the target code volume or an estimated compression code volume ascertained based upon previous compression results, a display unit that displays the nominal remaining frame quantity calculated at the remaining frame quantity calculation unit and an allowable upper limit setting unit that sets an extent to which the target code volume may be exceeded within a capacity range corresponding to the adjustment capacity. The compression processing unit performs a fixed-length compression on the image data while allowing the target code volume to be exceeded within the extent.

Since a portion of the capacity of the storage medium is designated in advance as the adjustment capacity and the target for the compression code volume can be exceeded in correspondence to the adjustment capacity, it is possible to ensure that the target is only exceeded to an appropriate extent during a fixed-length compression. Compared to a fixed-length compression, which does not allow the target for the compression code volume to be exceeded at all, the size of the final remaining area can be reduced with a high degree of efficiency. In addition, since the nominal remaining frame quantity is determined by excluding the adjustment capacity from the remaining capacity of the storage medium, the nominal remaining frame quantity is calculated to a value which is smaller by a degree corresponding to the adjustment capacity at all times. As a result, even when fluctuations in the compression code volume accumulate, for instance, an irregular change, in which the nominal remaining frame quantity becomes drastically decreased at once, can be prevented, and thus, the user is afforded worry-free operation.

The remaining-capacity correction unit may modify the adjustment capacity in correspondence to any of the remaining capacity, the previous compression results, the nominal remaining frame quantity and the remaining frame quantity determined by dividing the remaining capacity by the target code volume when calculating the nominal remaining capacity.

The electronic camera may further comprise a decision-making unit that makes a decision as to whether or not the possibility that the adjustment capacity will become completely used up by recording compressed data with a code volume exceeding the target within the extent into the storage medium while the storage medium still has room to allow one or more frames of data to be stored exists based upon a previous compression code volume tendency and a downward correction unit that makes a downward correction on the target code volume if the decision-making unit decides that there is such a possibility. In this structure, the compression processing unit implements an image data fixed-length compression by using the target code volume having undergone the downward correction.

An electronic camera according to the present invention comprises an image-capturing element that captures an image of a subject and outputs image data of the captured subject image, a compression processing unit that implements a fixed-length compression on the image data so as to compress the image data within a specific range of a target code volume, a recording unit that records compressed data resulting from the compression implemented at the compression processing unit into a storage medium, a remaining-capacity detection unit that detects the remaining capacity of the storage medium and an allowable upper limit setting unit that sets an extent to which the target code volume may be exceeded within a capacity range corresponding to the remaining capacity. The compression processing unit performs a fixed-length compression on the image data while allowing the target code volume to be exceeded within the extent.

Since the extent to which the target for the compression code volume may be exceeded is determined in correspondence to the remaining capacity, the target is allowed to be exceeded only to an appropriate extent during the fixed-length compression, thereby enabling a planned utilization of the remaining area.

The electronic camera further comprises a decision-making unit that makes a decision as to whether or not the possibility that the capacity corresponding to the remaining capacity will become completely used up by recording compressed data with a code volume exceeding the target within the extent into the storage medium while the storage medium still has room to allow one or more frames of data to be stored exists based upon a tendency in previous compression results and a downward correction unit that makes a downward correction on the target code volume if the decision-making unit decides that there is such a possibility. In this structure, the compression processing unit implements an image data fixed-length compression by using the target code volume having undergone the downward correction.

An electronic camera according to the present invention may alternatively comprise an image-capturing element that captures an image of a subject and outputs image data of the captured subject image, a compression processing unit that implements a fixed-length compression on the image data so as to compress the image data within a predetermined target code volume range, a recording unit that records compressed data resulting from the compression implemented at the compression processing unit into a storage medium, the remaining-capacity detection unit that detects the remaining capacity of the storage medium, an excess calculation unit that determines a value representing an excess by dividing the remaining capacity by the target code volume or an estimated compression code volume obtained based upon previous compression results and an allowable upper limit setting unit that sets an extent to which the target code volume may be exceeded within a capacity range corresponding to the excess. The compression processing unit in this electric camera performs a fixed-length compression on the image data while allowing the target code volume to be exceeded within the extent.

Since the compression code volume is allowed to exceed the target in conformance to the excess, the target can only be exceeded to an appropriate extent during the fixed-length compression, thereby enabling a planned utilization of the remaining area.

The electronic camera may further comprise a decision-making unit that makes a decision as to whether or not the possibility that the capacity corresponding to the excess will become completely used up by recording compressed data with a code volume exceeding the target within the extent into the storage medium while the storage medium still has room to allow one or more frames of data to be stored exists based upon a tendency in previous compression results and a downward correction unit that makes a downward correction on the target code volume if the decision-making unit decides that there is such a possibility. In this structure, the compression processing unit implements an image data fixed-length compression by using the target code volume having undergone the downward correction.

THE BEST MODE FOR CARRYING OUT THE INVENTION

The following is an explanation of the embodiments of the present invention, given in reference to the drawings.

First Embodiment

Figure 1:
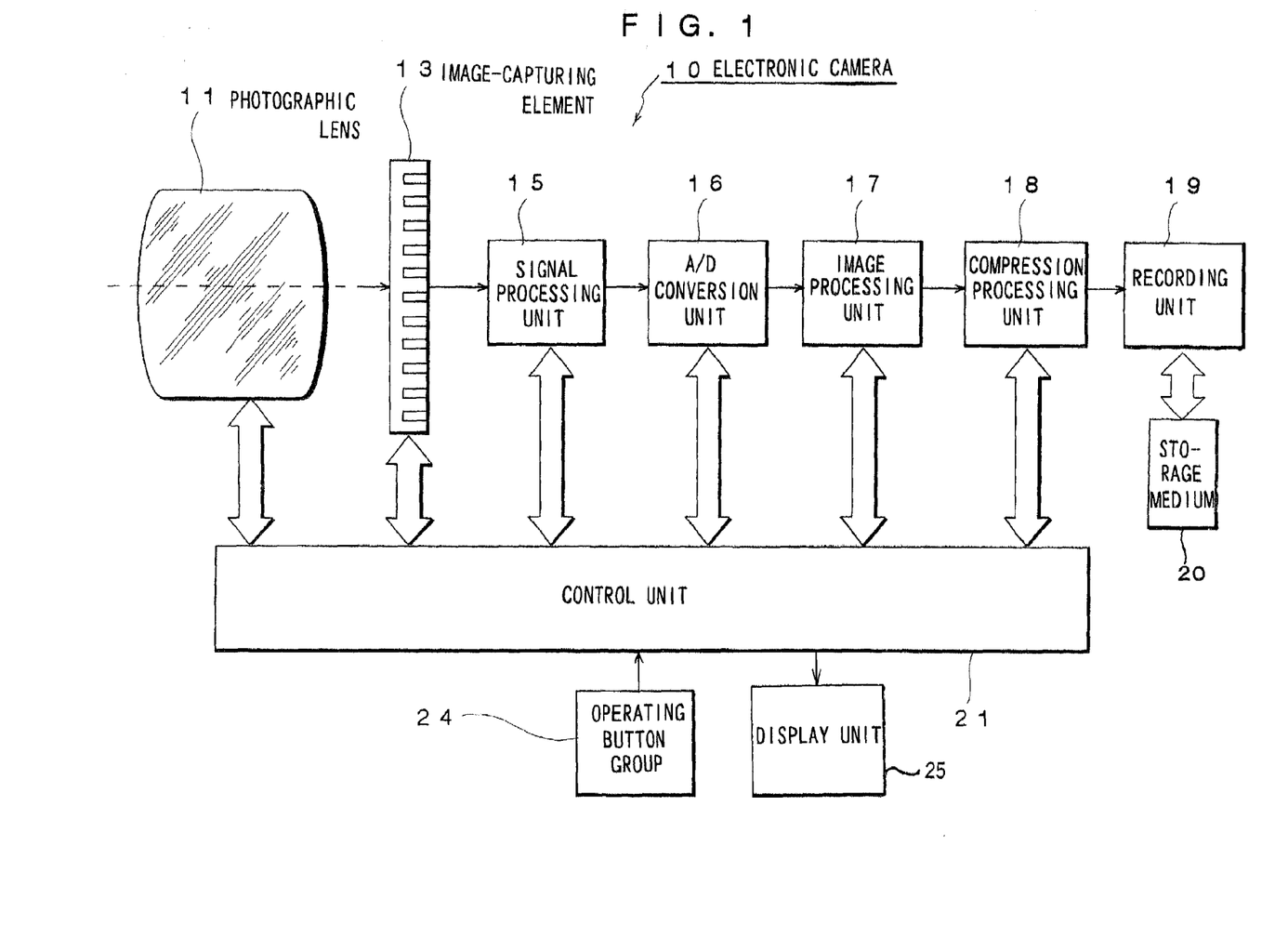
FIG. 1 is a schematic block diagram illustrating the structure adopted in an electronic camera.

FIG. 1 is a schematic block diagram illustrating the structure of an electronic camera 10. The electronic camera 10 in FIG. 1 is mounted with a photographic lens 11. An image-capturing element 13 is provided in the image space of the photographic lens 11. Image data generated at the image-capturing element 13 sequentially undergo specific types of processing at a signal processing unit 15, an A/D conversion unit 16 and an image processing unit 17, and then are input to a compression processing unit 18 as digital image data. The compression processing unit 18 performs JPEG compression on the input image data and outputs compressed data to a recording unit 19. The recording unit 19 records the input compressed image data to a storage medium 20 which may be a memory card.

The electronic camera 10 also includes a control unit 21 for implementing system control, an operating button group 24 and a display unit 25. The operating button group 24 is operated by the user to perform camera operations and to set the image quality of compressed image data. The number of remaining frames and the like are displayed at the display unit 25.

Figure 2:
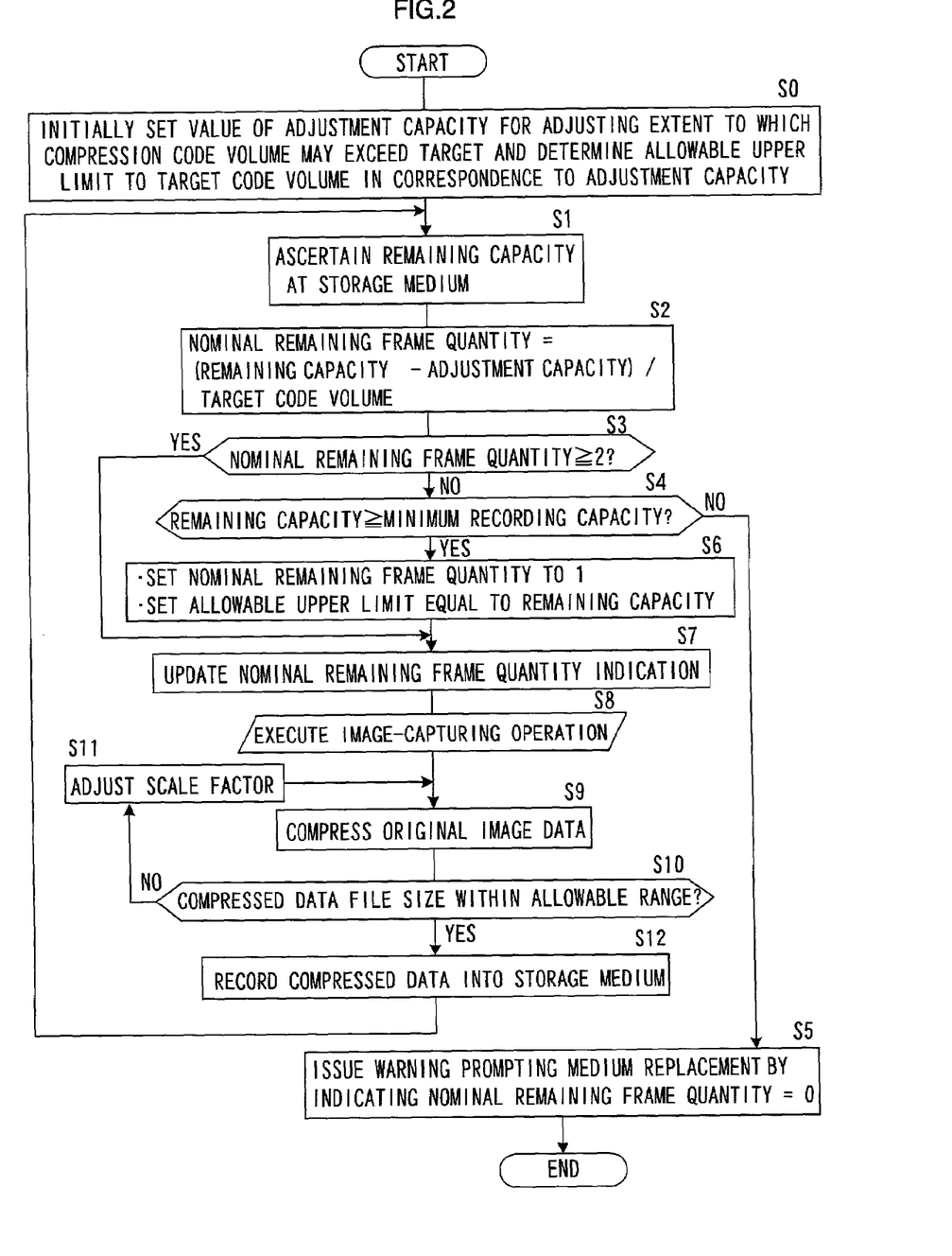
FIG. 2 is a flowchart of the image compression processing implemented in a first embodiment.

FIG. 2 is a flowchart of the image compression processing implemented at the compression processing unit 18. The following is an explanation of the image compression processing which characterizes the present invention, given in reference to FIG. 2. In step S0, the control unit 21 sets the adjustment capacity for adjusting the extent to which the compression code volume is allowed to exceed the target to an initial value. In addition, the control unit 21 determines an allowable upper limit to the target code volume in correspondence to the adjustment capacity set at the initial value. At this time, the allowable range for the target code volume should be set equal to or higher than (target code volume−allowable error) and equal to or lower than (target code volume+capacity corresponding to adjustment capacity).

In step S1, the control unit 21 engages in communication with the recording unit 19 and obtains the remaining capacity of the storage medium 20.

In step S2, the control unit 21 subtracts the predetermined adjustment capacity from the remaining capacity that has been obtained and thus calculates a nominal remaining capacity. The control unit 21 also divides the calculated nominal remaining capacity by the target code volume and thus determines a nominal remaining frame quantity.

In step S3, the control unit 21 makes a decision as to whether or not the nominal remaining frame quantity is equal to or higher than 2. If a negative decision is made, i.e., if it is decided that the nominal remaining frame quantity is equal to or smaller than 1, the control unit 21 judges that the storage capacity of the storage medium 20 is to be depleted soon and the operation proceeds to step S4. If, on the other hand, an affirmative decision is made, i.e., if it is decided that the nominal remaining frame quantity is equal to or larger than 2, the control unit 21 judges that the storage medium 20 still has available storage area and the operation proceeds to step S7.

In step S4, the control unit 21 makes a decision as to whether or not the remaining capacity of the storage medium 20 exceeds a predetermined minimum recording capacity. If the remaining capacity is lower than the minimum recording capacity and those a negative decision is made, the control unit 21 judges that the current target compression rate does not allow for enough space to store compressed data at the storage medium 20, before the operation proceeds to step S5. If, on the other hand, the remaining capacity exceeds the minimum recording capacity and thus an affirmative decision is made, the control unit 21 judges that the storage medium 20 still has enough space to store compressed data corresponding to one frame, and the operation proceeds to step S6.

It is to be noted that the minimum recording capacity may be set at the allowable upper limit of the target code volume (set without taking into consideration the adjustment capacity). In addition, it may be set to the allowable lower limit to the target code volume. Alternatively, the minimum recording capacity may be set independently of the conditions for ending the fixed-length compression processing.

In step S5, the control unit 21 issues a warning prompting a replacement of the recording medium 20 by indicating the nominal remaining frame quantity as "0" at the display unit 25. The control unit 21 temporarily stops the photographing operation and the like in this state and waits in standby until the user replaces the storage medium 20.

In step S6, the control unit 21 sets the nominal remaining frame quantity to "1". The control unit 21 also sets the allowable upper limit to the target code volume equal to the remaining capacity to achieve maximum efficiency in utilizing the final remaining area.

In step S7, the control unit 21 indicates the nominal remaining frame quantity at the display unit 25 of the electronic camera 10.

In step S8, the control unit 21 remains in standby for an image capturing operation by the user and executes an image capturing processing once the image capturing operation is performed by the user. It is to be noted that if the setting for the target compression rate (target code volume) is changed while the control unit 21 is in standby, the control unit 21 returns to step S1 to reset the nominal remaining frame quantity.

In step S9, the control unit 21 issues an instruction to perform an image compression to the compression processing unit 18. The compression processing unit 18 executes an image compression on image data obtained through the image capturing operation.

In step S10, the control unit 21 makes a decision as to whether not the file size of the compressed data resulting from the image compression is within the allowable range for the target code volume. If the file size is outside the allowable range and thus, a negative decision is made, the control unit 21 proceeds to step S11. If the file size is within the allowable range and an affirmative decision is made, on the other hand, the control unit 21 proceeds to step S 12.

In step S11, the control unit 21 makes an adjustment by either increasing or decreasing the scale factor in reference to the compression results and then returns to step S9.

In step S12, the control unit 21 issues an instruction to record the compressed data to the recording unit 19. In response, the recording unit 19 records the compressed data at the storage medium 20. Once the recording processing is completed, the control unit 21 returns to step S1 to standby for a photographing operation for the next frame.

Through the sequence of processing explained above, the nominal remaining frame quantity is calculated and the fixed-length compression is executed by taking into consideration the adjustment capacity.

To summarize the actions and advantages achieved in the first embodiment, the control unit 21 sets aside in advance a portion of the storage capacity of the storage medium 20 as the adjustment capacity and allows the compression code volume to exceed the target during the image compression within a capacity range corresponding to the secured adjustment capacity. The allowable target code volume range is equal to or higher than (target code volume−allowable error) and equal to or lower than (target code volume+capacity corresponding to adjustment capacity). In this situation, when the image compression is implemented on image data with a large image information volume the compression code volume of which is bound to be relatively large, the compression code volume is allowed to exceed the target as necessary by prioritizing the utilization of the remaining area. As a result, the remaining area can be reliably reduced while preventing any loss of image quality resulting from the compression as appropriate.

In addition, the nominal remaining frame quantity is calculated (step S2) smaller in consideration of the adjustment capacity by subtracting the adjustment capacity from the remaining capacity of the storage medium 20 in the first embodiment and, thus, worrisome situations for the user such as a drastic decrease in the number of remaining frames at the indicator during an operation can be prevented.

Furthermore, a decision is made as to whether or not the number of remaining frames over which image data can be recorded at the storage medium 20 is 1 (step S4) and the allowable upper limit to the target code volume is set equal to the remaining capacity when the number of remaining frames reaches 1 (step S6) in the first embodiment. As a result, compressed data resulting from the fixed-length compression, the size of which is very close to the remaining capacity, are allowed to be recorded, thereby making it possible to effectively reduce the remaining area in the storage medium 20.

It is to be noted that while an explanation is given above in reference to the first embodiment on an example in which the adjustment capacity is fixed, the adjustment capacity does not need to be fixed. For instance, the adjustment capacity may be changed in correspondence to the remaining capacity, the results of a previous compression or the number of remaining frames (the number of frames calculated without taking into consideration the adjustment capacity).

Alternatively, the adjustment capacity may be adjusted in the following manner. Under normal circumstances, the remaining area, which is used up as the remaining capacity and the remaining frame quantity decrease at the storage medium, is assumed to become smaller over time, since the capacity corresponding to the adjustment capacity is larger than the allowable error. Namely, when the allowable target code volume is set equal to or higher than (target code volume−allowable error) and equal to or lower than (target code volume+capacity corresponding to adjustment capacity), the range above the target code volume is bound to be wide and thus the size of the data having undergone the compression processing is likely to be larger than the target code volume. Accordingly, by gradually reducing the adjustment capacity as the remaining capacity or the remaining frame quantity decreases, a planned utilization of the remaining area up to the very last frame is enabled.

In addition, the control unit 21 may adjust the adjustment capacity to a larger value if the extent to which the previous compression code volume exceeded the target has been larger than expected. In this case, an even more smaller value is set for the nominal remaining frame quantity to further ensure that an irregular change such as a drastic reduction in the nominal remaining frame quantity is prevented.

The control unit 21 may adjust the adjustment capacity to a larger value if the previous compression code volume is smaller than the target code volume and a large remaining area is expected to be left unused, instead. In this case, the remaining area can be used up more efficiently by allowing the compression code volume to exceed the target to a further extent.

It is to be noted that while the nominal remaining frame quantity is calculated by dividing the nominal remaining capacity by the target code volume in the first embodiment, the present invention is not limited to this example. For instance, the nominal remaining frame quantity may be calculated by dividing the nominal remaining capacity by an estimated compression code volume value ascertained based upon previous compression results.

Second Embodiment

Figure 3:
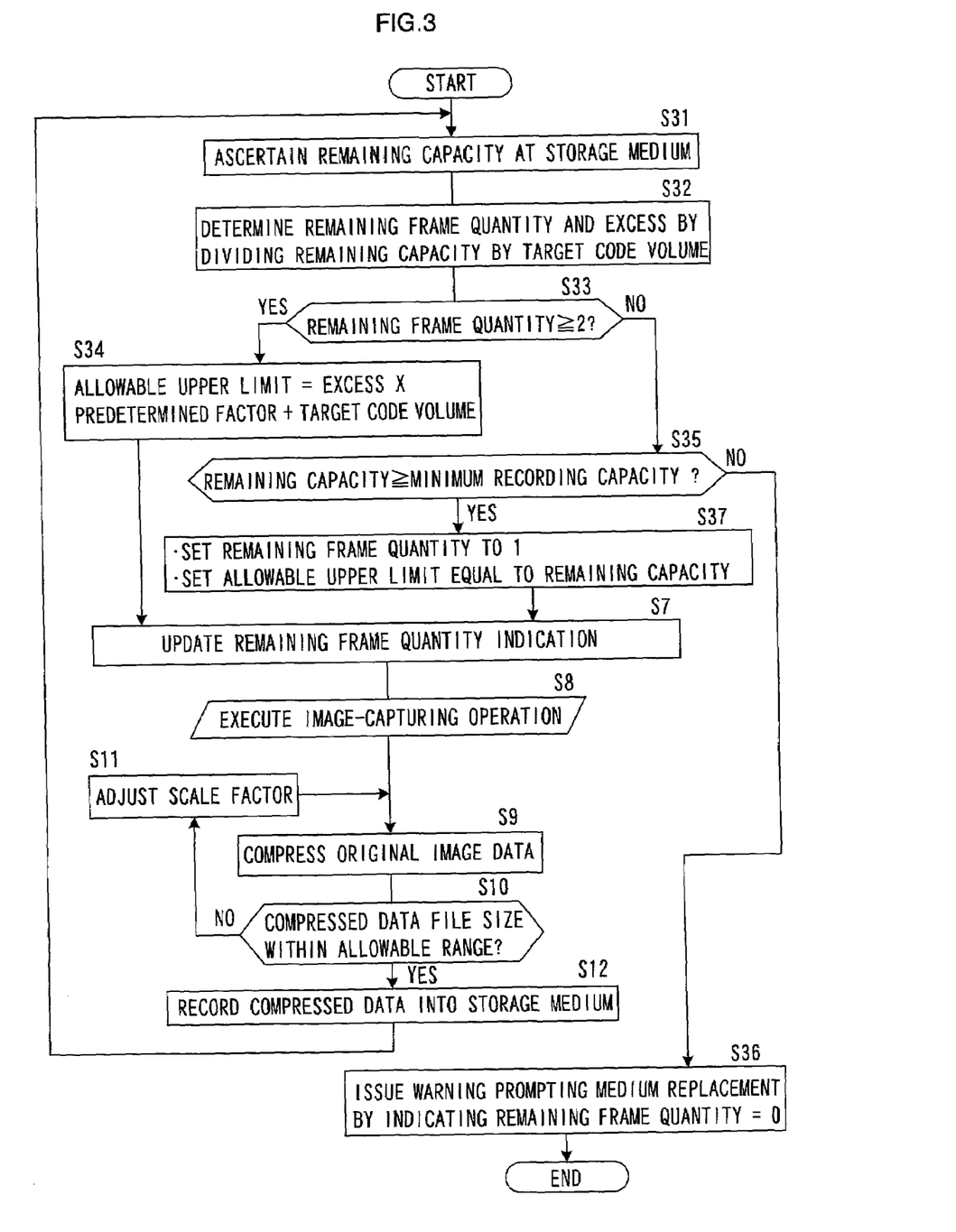
FIG. 3 is a flowchart of the image compression processing implemented in a second embodiment.

FIG. 3 presents a flowchart of the image compression processing implemented at the control unit 21 in the second embodiment. It is to be noted that since the electronic camera is structured identically to that in the first embodiment (see FIG. 1), its explanation is omitted. In step S31 in FIG. 3, the control unit 21 engages in communication with the recording unit 19 and obtains the remaining capacity at the storage medium 20.

In step S32, the control unit 21 determines the remaining frame quantity and the excess by dividing the remaining capacity that has been obtained by the target code volume.

In step S33, the control unit 21 makes a decision as to whether or not the remaining frame quantity is equal to or larger than 2. If the remaining frame quantity is equal to or larger than 2 and thus an affirmative decision is made, the control unit 21 proceeds to step S34. If, on the other hand, the remaining frame quantity is 1 or 0 and a negative decision is made, the control unit 21 and proceeds to step S35.

In step S34, the control unit 21 calculates an allowable upper limit by adding the target code volume to a value obtained by multiplying the excess by a predetermined factor before the operation proceeds to step S7. It is to be noted that since the processing in steps S7~S12 is identical to the processing in FIG. 2 implemented in the first embodiment, its explanation is omitted.

In step S35, the control unit 21 makes a decision as to whether or not the remaining capacity of the storage medium 20 exceeds a predetermined minimum recording capacity. If the remaining capacity is lower than the minimum recording capacity and thus a negative decision is made, the control unit 21 judges that the current target compression rate does not allow for enough space to store compressed data at the storage medium 20, before the operation proceeds to step S36. If, on the other hand, the remaining capacity exceeds the minimum recording capacity and thus an affirmative decision is made, the control unit 21 judges that the storage medium 20 still has enough space to store compressed data corresponding to one frame, and the operation proceeds to step S37.

In step S36, the control unit 21 indicates the remaining frame quantity "0" at the display unit 25 and temporarily halts the image capturing operation and the like after issuing a warning to prompt replacement of the storage medium 20.

In step S37, the control unit 21 sets the remaining frame quantity to "1". The control unit 21 also sets the allowable upper limit to the target code volume equal to the remaining capacity to achieve maximum efficiency in utilizing the final remaining area. Then, the control unit 21 proceeds to step S7. Since the processing implemented in step S7 and subsequent steps is identical to the processing in the first embodiment explained earlier, its explanation is omitted.

Through the sequence of processing explained above, the fixed-length compression is executed by allowing for a change occurring in the excess (the estimated capacity value representing the remaining area).

To summarize the actions and advantages achieved in the second embodiment, the control unit 21 determines the remaining frame quantity and the excess by dividing the remaining capacity at the storage medium 20 by the target code volume and dynamically adjusts the allowable upper limit to the target code volume as long as there is still ample remaining capacity. As a result, the compression code volume is allowed to exceed the target over an appropriate deviation range in correspondence to the estimated capacity value representing the remaining area assumed to remain unused at the storage medium 20 in the end and thus, the final remaining area can be used up sufficiently and appropriately to leave a minimal area left unused during the fixed-length compression. In particular, since the compression code volume resulting from an image compression on image data with a large image information volume tends to exceed the target to an appropriate degree, the extent of the loss of image quality resulting from the compression is lessened to a desirable degree.

Since the allowable upper limit can be lowered when the remaining capacity has decreased and there is no longer any margin left, the remaining area can be utilized in a more economical manner in such a case to ensure that the remaining area is not used up while the operation is still in progress.

In addition, the formula described in reference to step S34 is utilized to calculate the allowable upper limit in the second embodiment. Since any excess data beyond the target code volume corresponding to the current frame are stored by utilizing only a portion of the excess, the remaining excess can be left for storing data overflow from subsequent frames.

It is to be noted that the formula used to calculate the allowable upper limit for utilizing a portion of the excess is not limited to that used in step S34. Generally speaking, any capacity value smaller than the excess can be allocated for the allowable upper limit. For instance, the allowable upper limit may be calculated by adding the target code volume to a value obtained by dividing the excess by the remaining frame quantity.

Third Embodiment

Figure 4A:
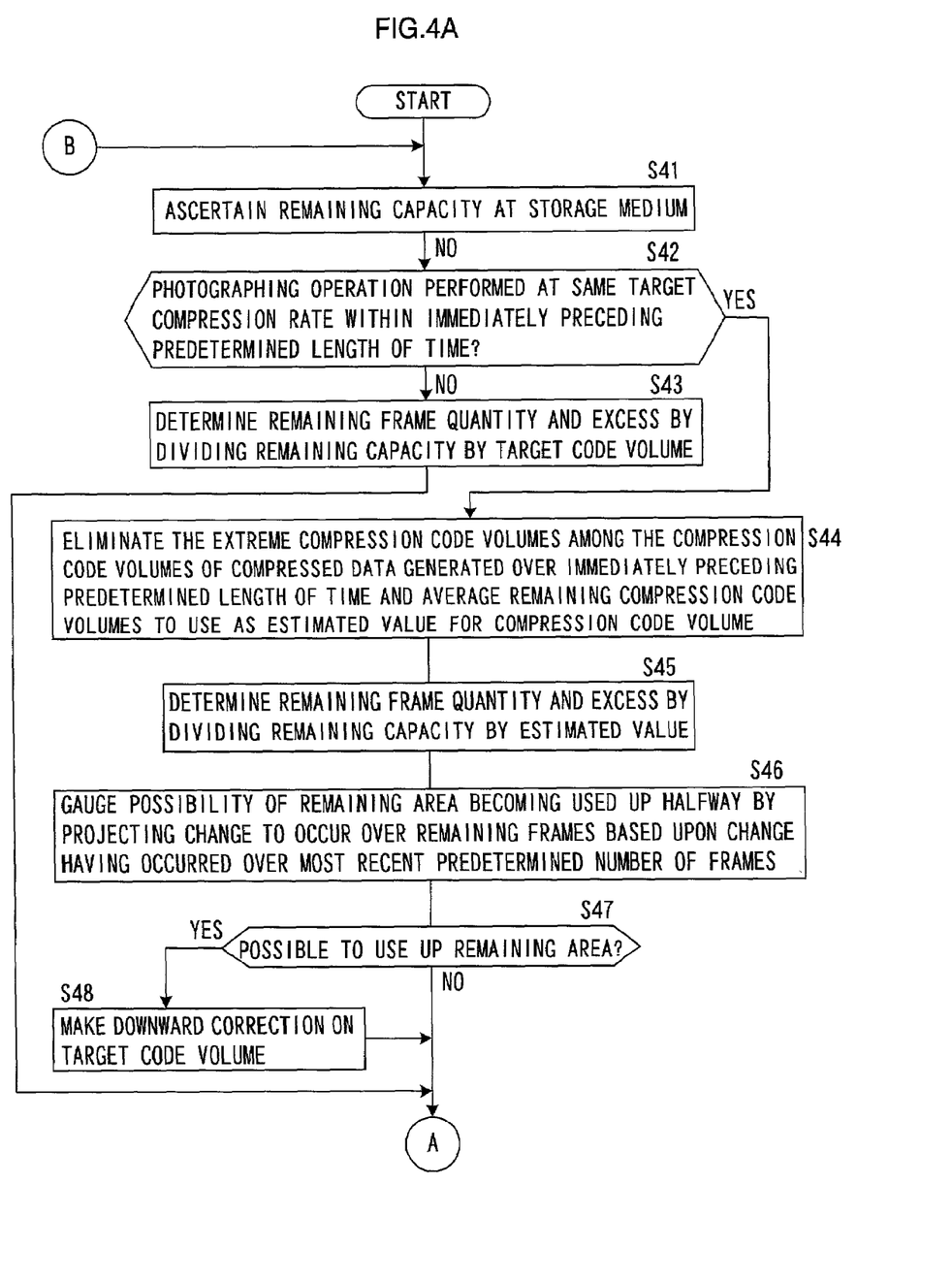
FIG. 4A is a flowchart of the first half of the image compression processing implemented in a third embodiment.
Figure 4B:
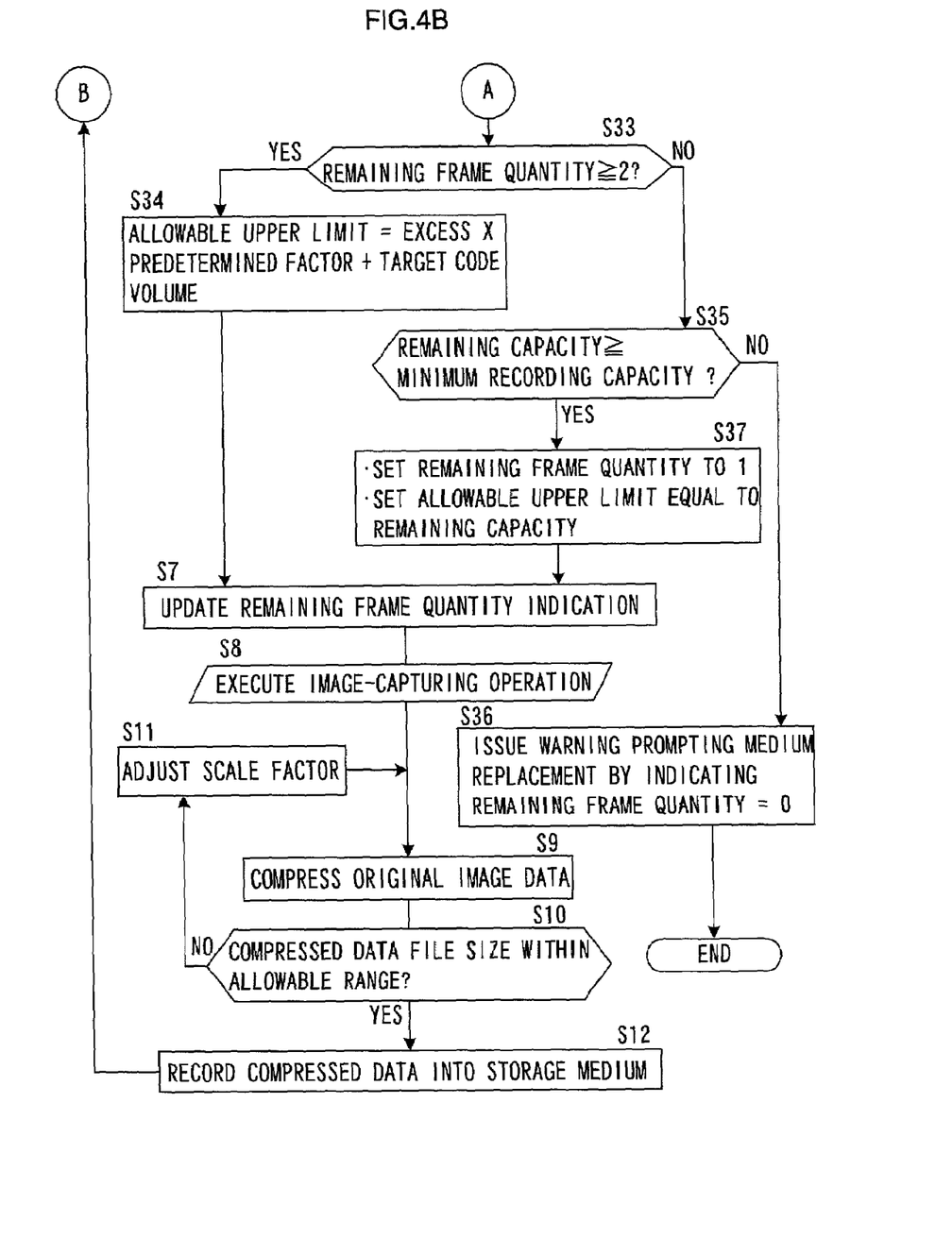
FIG. 4B is a flowchart of the second half of the image compression processing implemented in the third embodiment.

FIGS. 4A and 4B present a flowchart of the image compression processing implemented at the control unit 21 in the third embodiment. It is to be noted that since the electronic camera is structured identically to that in FIG. 1, its explanation is omitted. In step S41 in FIG. 4A, the control unit 21 engages in communication with the recording unit 19 and obtains the remaining capacity at the storage medium 20.

In step S42, the control unit 21 makes a decision as to whether or not there are any compressed data obtained through a photographing operation performed at the same target compression rate within an immediately preceding specific length of time. If a negative decision is made, i.e., if no such compressed data are present, the control unit 21 proceeds to step S43. If, on the hand, an affirmative decision is made that compressed data are present, the control unit 21 proceeds to step S44.

In step S43, the control unit 21 determines the remaining frame quantity and the excess by dividing the remaining capacity by the target code volume and then the operation proceeds to step S33. It is to be noted that since the processing in steps S33~S37 and in steps S7~S12 is identical to the processing in FIG. 3 implemented in the second embodiment, its explanation is omitted.

In step S44, the control unit 21 obtains the compression code volumes of the compressed data generated during the immediately preceding predetermined length of time. The control unit 21 then eliminates any extreme values among the compression code volumes thus obtained and averages the remaining compression code volumes to use as an estimated compression code volume value.

In step S45, the control unit 21 determines the remaining frame quantity and the excess by dividing the remaining capacity by the estimated value.

In step S46, the control unit 21 makes an estimate as to whether or not there is a possibility of the remaining area (the excess, to be more specific) at the storage medium 20 being used up while the operation is in progress by projecting the change in the excess over the remaining frames based upon the change having occurred over the most recent predetermined number of frames.

If an affirmative decision is made in step S47 that there is a possibility of the remaining area being used up while the operation is in progress, the control unit 21 proceeds to step S48. If, on the other hand, a negative decision is made that there is no possibility of the remaining area being used up for the time being, the control unit 21 proceeds to step S33 in FIG. 4B. It is to be noted that since the processing in step S33 and subsequent steps is identical to the processing in the second embodiment, its explanation is omitted.

In step S48, the control unit 21 makes a downward correction on the target code volume so as to ensure that the remaining area is not used up while the operation is in progress in an attempt to restore the remaining area. Then, the control unit 21 proceeds to step S33 in FIG. 4B. Since the processing in step S33 and subsequent steps is identical to the processing implemented in the second embodiment explained earlier, its explanation is omitted.

Through the sequence of processing explained above, the fixed-length compression is executed by taking into consideration changes occurring in the excess (referred to as the estimated capacity value representing the remaining area) ascertained by dividing the remaining capacity by the target code volume or by the estimated value for the compression code volume.

To summarize the actions and advantages achieved in the third embodiment, the control unit 21 allows the compression code volume to exceed the target over an appropriate deviation range in correspondence to the utilization status of the remaining area during the fixed-length compression as in the second embodiment and, as a result, it becomes possible to reduce the ultimate remaining area in an appropriate and sufficient degree.

In particular, by ascertaining an estimated compression code volume value based upon the compression code volumes of compressed data generated during the immediately preceding predetermined length of time (step S44), dividing the remaining capacity at the storage medium 20 by the estimated value to determine the remaining frame quantity and the excess (step S45) and projecting the change in the excess over the remaining frames based upon the change have occurred over the most recent predetermined number of frames (step S46), the possibility of the remaining area of the storage medium 20 being used up while the operation is in progress is gauged. If the remaining area becomes small, the need to greatly narrow the allowable target code volume range for the fixed-length compression arises. When the allowable range is narrowed under such circumstances, the frequency with which the scale factor has to be adjusted increases, which may result in a delay in the completion of the fixed-length compression. However, by gauging the possibility of the remaining area becoming used up halfway as in the third embodiment, a downward correction can be made on the target code volume if, for instance, the target is exceeded frequently resulting in a drastic reduction in the remaining area (step S48). As a result, the remaining area can be restored on the storage medium 20. Consequently, the remaining area is not used up halfway and thus, any increase in the length of time required for the fixed-length compression processing is prevented.

Fourth Embodiment

Figure 5:
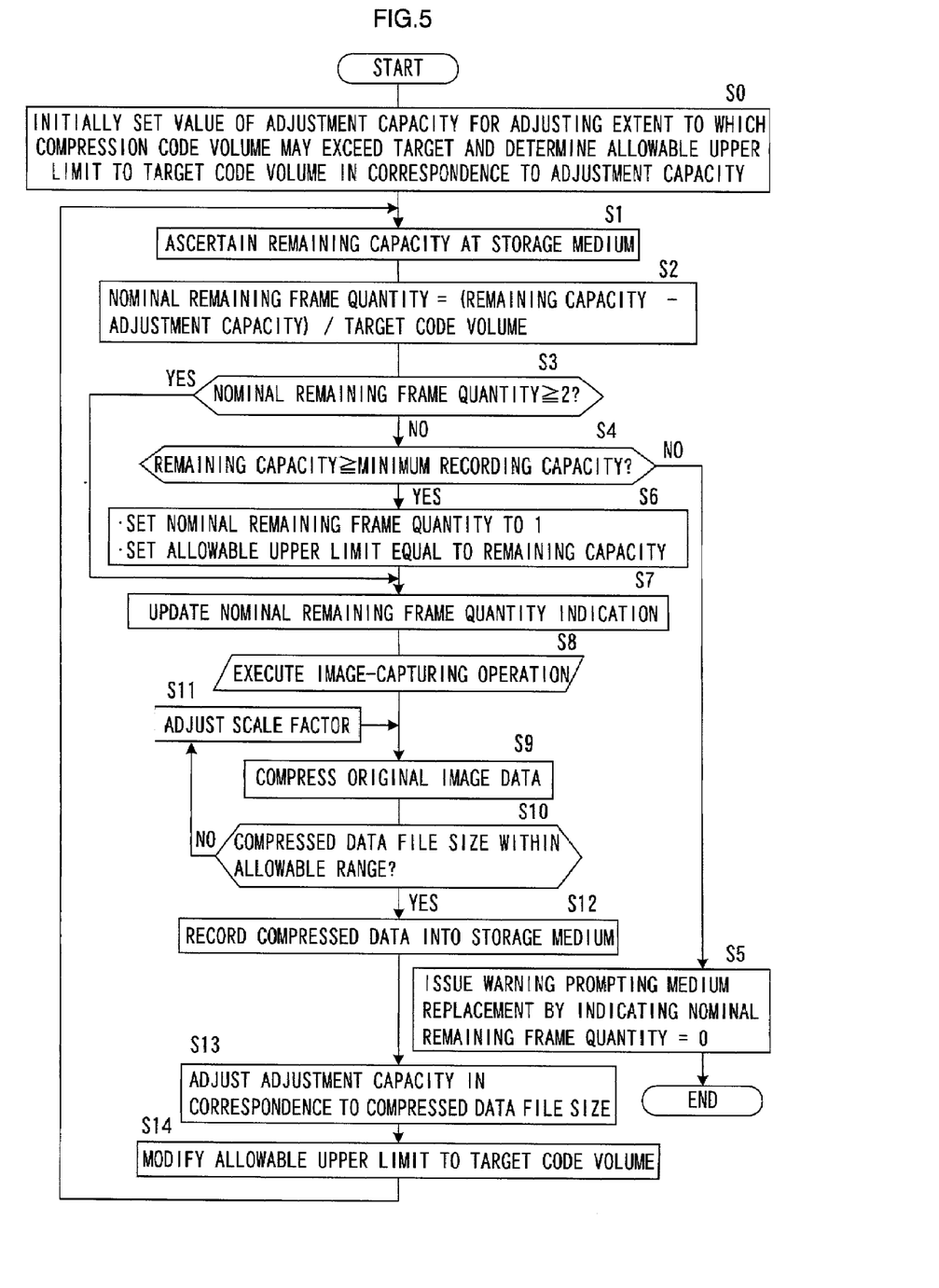
FIG. 5 is a flowchart of the image compression processing implemented in a fourth embodiment.

FIG. 5 presents a flowchart of the image compression processing implemented at the control unit 21 in the fourth embodiment. Since the image compression processing in the embodiment is achieved by adding steps S13 and S14 to the processing in the flowchart in FIG. 2 achieved in the first embodiment, an explanation is given by focusing on the processing implemented and these two steps. It is to be noted that the electronic camera assumes a structure identical to that shown in FIG. 1 and thus, its explanation is omitted.

After the recording unit 19 records compressed data into the storage medium 20 in step S12, the control unit 21 proceeds to step S13.

In step S13, the control unit 21 modifies the adjustment capacity in correspondence to the file size of the compressed data that have been recorded immediately before.

In step S14, the control unit 21 modifies the allowable upper limit to the target code volume in correspondence to the modified adjustment capacity. After the modification processing, the control unit 21 returns to step S1 and stands by for the photographing operation for the next frame.

Through the sequence of processing explained above, the nominal remaining frame quantity is calculated and the fixed-length compression is executed by taking into consideration the adjustment capacity.

To summarize the actions and advantages achieved in the fourth embodiment, the control unit 21 sets aside in advance a portion of the storage capacity of the storage medium 20 as the adjustment capacity and allows the compression code volume to exceed the target during the image compression within a capacity range corresponding to the secured adjustment capacity, thereby achieving a reduction in the ultimate remaining area, as in the first embodiment.

In addition, the nominal remaining frame quantity is calculated (step S2) smaller in consideration of the adjustment capacity by subtracting the adjustment capacity from the remaining capacity of the storage medium 20 and, thus, worrisome situations for the user such as a drastic decrease in the number of remaining frames at the indicator during an operation can be prevented.

Furthermore, a decision is made as to whether or not the number of remaining frames over which image data can be allowable upper limit to the target code volume is set equal to the remaining capacity when the number of remaining frames reaches 1 (step S6) in the fourth embodiment. As a result, compressed data resulting from the fixed-length compression, the size of which is very close to the remaining capacity, are allowed to be recorded, thereby making it possible to effectively reduce the remaining area in the storage medium 20.

Moreover, the control unit 21 modifies the adjustment capacity in correspondence to the file size of the compressed data having been recorded immediately before (step S13) and modifies the allowable upper limit to the target code volume in conformance to the modified adjustment capacity (step S14). Thus, when the file size is very large (small) and the target code volume is exceeded (not exceeded) to result in a decrease (increase) of the remaining area, for instance, an appropriate and sufficient reduction in the ultimate remaining area can be achieved by making a downward (upward) correction on the allowable upper limit to the target code volume.

It is to be noted that while the adjustment capacity is modified in correspondence to the file size of the compressed data having been recorded immediately before, the adjustment capacity may be adjusted in correspondence to the results of one or more previous compressions, the remaining capacity or the remaining frame quantity. Under normal circumstances, the remaining area is assumed to be used up and become smaller over time, as the remaining capacity and the remaining frame quantity decrease at the storage medium 20. Accordingly, the control unit 21 gradually reduces the adjustment capacity as the remaining capacity or the remaining frame quantity decreases to achieve a planned utilization to use up the remaining area up to the very last frame.

In addition, the control unit 21 may adjust the adjustment capacity to a larger value if the extent to which the previous compression code volume exceeded the target has been larger than expected. In this case, an even more smaller value is set for the nominal remaining frame quantity to further ensure that an irregular change in the nominal remaining frame quantity is prevented.

As an alternative, the control unit 21 may adjust the adjustment capacity to a larger value if the previous compression code volume is smaller than the target code volume and a large remaining area is expected to be left unused as well. In this case, the remaining area can be used up more efficiently by allowing the compression code volume to exceed the target to a further extent.

It is to be noted that while the nominal remaining frame quantity is calculated by dividing the nominal remaining capacity by the target code volume in the fourth embodiment, the present invention is not limited to this example. For instance, the nominal remaining frame quantity may be calculated by dividing the nominal remaining capacity by an estimated compression code volume value ascertained based upon previous compression results.

INDUSTRIAL APPLICABILITY

While an explanation is given above on an example in which the present invention is adopted in conjunction with an electronic camera which stores compressed image data at a detachable storage medium such as a memory card, the present invention may also be adopted in an electronic camera which stores image data in an internal memory. In addition, the present invention may be adopted in a PDA (personal digital assistant) as well as in electronic cameras. Furthermore, while an explanation is given above on an example in which the present invention is adopted in an electronic camera which implements JPEG compression on image data, the present invention may also be adopted in an electronic camera that implements MPEG compression for dynamic images.

What is claimed is:

1. An electronic camera comprising:
    an image-capturing element that captures an image of a subject and outputs image data of the captured subject image;

a compression processing unit that implements a fixed-length compression on the image data so as to compress the image data within a specific range of a target code volume;

a recording unit that records compressed data resulting from the compression implemented at said compression processing unit into a storage medium;

a remaining-capacity detection unit that detects a remaining capacity of the storage medium;

a remaining-capacity correction unit that determines a nominal remaining capacity by subtracting a predetermined adjustment capacity from the remaining capacity;

a remaining frame quantity calculation unit that determines a nominal remaining frame quantity by dividing said nominal remaining capacity by the target code volume or an estimated compression code volume ascertained based upon previous compression results;

a display unit that displays said nominal remaining frame quantity calculated at said remaining frame quantity calculation unit; and an allowable upper limit setting unit that sets an extent to which said target code volume may be exceeded within a capacity range corresponding to said adjustment capacity, wherein:

said compression processing unit performs a fixed-length compression on the image data while allowing said target code volume to be exceeded within said extent.

2. An electronic camera according to claim 1, wherein:

said remaining-capacity correction unit modifies said adjustment capacity in correspondence to any of the remaining capacity, previous compression results, said nominal remaining frame quantity and a remaining frame quantity determined by dividing the remaining capacity by said target code volume, to calculate said nominal remaining capacity.

3. An electronic camera according to claim 1, further comprising:

a decision-making unit that makes a decision as to whether or not a possibility of said adjustment capacity becoming completely used up by recording compressed data, which exceeds the target code volume within said extent, into the storage medium exists while the storage medium still has room to allow frames of data to be stored, based upon a previous compression code volume tendency; and a downward correction unit that makes a downward correction on said target code volume if said decision-making unit decides that there is such a possibility, wherein:

said compression processing unit implements a fixed-length compression on the image data by using said target code volume having undergone downward correction.

4. An electronic camera comprising:

an image-capturing element that captures an image of a subject and outputs image data of the captured subject image;

a compression processing unit that implements a fixed-length compression on the image data so as to compress the image data within a specific range of a target code volume;

a recording unit that records compressed data resulting from the compression implemented at said compression processing unit into a storage medium;

a remaining-capacity detection unit that detects a remaining capacity of the storage medium; and an allowable upper limit setting unit that sets an extent to which said target code volume may be exceeded within a capacity range corresponding to said remaining capacity, wherein:

said compression processing unit performs fixed-length compression on the image data while allowing said target code volume to be exceeded within said extent.

5. An electronic camera according to claim 4, further comprising:

a decision-making unit that makes a decision as to whether or not a possibility of a capacity corresponding to the remaining capacity becoming completely used up by recording compressed data, which exceeds the target code volume within said extent, into the storage medium exists while the storage medium still has room to allow frames of data to be stored, based upon a previous compression code volume tendency; and a downward correction unit that makes a downward correction on said target code volume if said decision-making unit decides that there is such a possibility, wherein:

said compression processing unit implements a fixed-length compression on the image data by using said target code volume having undergone downward correction.

6. An electronic camera comprising:

an image-capturing element that captures an image of a subject and outputs image data of the captured subject image;

a compression processing unit that implements a fixed-length compression on the image data so as to compress the image data within a specific range of a target code volume;

a recording unit that records compressed data resulting from the compression implemented at said compression processing unit into a storage medium;

a remaining-capacity detection unit that detects a remaining capacity of the storage medium;

an excess calculation unit that determines a value representing an excess by dividing the remaining capacity by said target code volume or an estimated compression code volume obtained based upon previous compression results; and an allowable upper limit setting unit that sets an extent to which said target code volume may be exceeded within a capacity range corresponding to said excess, wherein:

said compression processing unit performs a fixed-length compression on the image data while allowing said target code volume to be exceeded within said extent.

7. An electronic camera according to claim 6, further comprising:

a decision-making unit that makes a decision as to whether or not a possibility of a capacity corresponding to said excess becoming completely used up by recording compressed data, which exceeds the target code volume within said extent, into the storage medium exists while the storage medium still has room to allow frames of data to be stored, based upon a previous compression code volume tendency; and a downward correction unit that makes a downward correction on said target code volume if said decision-making unit decides that there is such a possibility, wherein:

said compression processing unit implements a fixed-length compression on the image data by using said target code volume having undergone downward correction.

* * * * *